United States Patent [19]
Webb

[11] Patent Number: 5,889,271
[45] Date of Patent: Mar. 30, 1999

[54] METHOD OF READING A SECURITY THREAD

[76] Inventor: Martin John Webb, 20 Meadow Road, Loughton, Essex, England, IG10 4HZ

[21] Appl. No.: 836,636
[22] PCT Filed: Nov. 7, 1995
[86] PCT No.: PCT/GB95/02608
  § 371 Date: May 15, 1997
  § 102(e) Date: May 15, 1997
[87] PCT Pub. No.: WO96/16381
  PCT Pub. Date: May 30, 1996

[30] Foreign Application Priority Data

Nov. 18, 1994 [GB] United Kingdom ............... 9423290
Nov. 19, 1994 [GB] United Kingdom ............... 9423420

[51] Int. Cl.$^6$ ....................................................... G06K 7/10
[52] U.S. Cl. ................................................ 235/462; 235/472
[58] Field of Search ................................. 235/462, 472, 235/449, 375, 494, 454, 493; 340/825.31–825.34; 359/2, 3

[56] References Cited

U.S. PATENT DOCUMENTS

| | | | |
|---|---|---|---|
| 3,978,450 | 8/1976 | Sanner et al. | 340/146.3 |
| 5,093,184 | 3/1992 | Edwards | 428/195 |
| 5,279,403 | 1/1994 | Harbaugh et al. | 194/207 |
| 5,419,424 | 5/1995 | Harbaugh | 194/206 |
| 5,614,824 | 3/1997 | Dames et al. | 324/239 |
| 5,631,039 | 5/1997 | Knight et al. | 427/7 |
| 5,736,722 | 4/1998 | Chamberlain, IV | 235/449 |
| 5,757,521 | 5/1998 | Walters et al. | 359/2 |
| 5,786,910 | 7/1998 | Walters et al. | 359/2 |

FOREIGN PATENT DOCUMENTS 0 413 534  2/1991  European Pat. Off. .
2 098 768  11/1982  United Kingdom .

Primary Examiner—Thien M Le
Attorney, Agent, or Firm—Walter C. Farley

[57] ABSTRACT

A security thread detector assembly for reading a security thread carried by a security document and coded such that each of a succession of segments along the thread represents a digital value, the particular digital value being represented by the particular characteristic of the respective segment comprises a head having a multiplicity of parallel reading channels having a track pitch which is substantially less than the length of a segment and being disposed to read the document such that the thread is substantially broadside to the channels, whereby all the segments are sensed substantially simultaneously and each segment is represented by a plurality of samples.

4 Claims, 4 Drawing Sheets

METHOD OF READING A SECURITY THREAD

FIELD OF THE INVENTION

The present invention relates to coded security threads such as may be used in bank notes or other security documents, and particularly to a detector assembly which is intended for the reading of a thread which is presented for reading broadside, so that various parts of the thread can be read substantially simultaneously.

BACKGROUND TO THE INVENTION

It is now commonplace to provide security threads within bank notes and other security documents. Originally a security thread was a simple metallic thread, but-according to current practice the thread, which may typically comprise a laminate of long, thin strips of polyester and an intermediate magnetic track, is magnetically coded. The magnetic coding of the strip is preferably digital, usually binary, and it is usual for the magnetic track to be constituted by a succession of segments each associated with a particular digital value, the length of the segments or 'bit lengths' being constant, typically about 2 mm. Examples of magnetic threads of this kind are disclosed in British Patent GB-B-2098768 and European Patent EP-B-0407550. Other magnetic threads with which the invention may be used are disclosed in EP-B-0310707 and EP-A-0428779. The particular manner of representation of the different digital values may vary. For example, in the specific example described in EP-B-0407550, a segment which represents a '0' is characterised by the absence of magnetic material and a segment which represents a binary '1' is constituted by the presence of magnetic material. Thus the track may be constituted by lengths comprising one or more segments of magnetic material or segments having no magnetic material, depending on the digital coding of the thread. However, the invention is not limited to use with such a thread; other forms of representation of the digital values, such as different thicknesses of thread, different widths of thread or other different magnetic characteristics, can be employed, provided that a reader possibly including a threshold detector can distinguish between the characteristics of different segments. It may be noted that there is not necessarily an identifiable boundary between adjacent segments, though proper framing of the digital output can be achieved by the use of termination codes between the code words.

It has hitherto been considered necessary to read a magnetic track by means of a detector assembly with respect to which the thread is moved with a substantial component of movement along the length of the track. Such a state of the art is acknowledged, for example, in EP-A-0413534. This is a substantial disadvantage, because it is customary to provide for a bank note or other security document, which is rectangular in form, a security thread which extends across the document from top to bottom so that the thread is parallel to the shorter sides of the document. Accordingly, if the thread has to be read longitudinally, the document must be fed such that the longer side is presented first.

EP-A-0413534 describes an attempt to alleviate this difficulty and describes a reader for a note that has the security thread running from top to bottom parallel to the shorter side and is presented to a reader with a shorter side leading. The solution proposed in EP-A-0413534 is the use of a detector which extends at a substantial acute angle, typically 45°, to the line of movement of the bank note, this line of movement being at right angles to the security thread. This is an awkward and rather inefficient solution.

SUMMARY OF THE INVENTION

The present invention is based on a thread detector assembly which can read a coded thread presented broadside to the detector so that, even allowing for some skewing of the security thread, the various parts of the thread are read substantially simultaneously and in parallel. A further object of the invention is to provide a head detector which can provide a more accurate detection of the code with the aid of multiple sampling.

According to one aspect of the invention, a magnetic thread detector assembly which is adapted to read a magnetic security thread, which is carried by a security document and comprises a succession of coded segments, in response to movement of the thread relative to the assembly in a direction substantially at a right angle to the thread comprises a multiple channel magnetic head of which the channel spacing is smaller along the length of the thread than a segment whereby all the segments which are to be read are read substantially simultaneously and each segment is read by several channels and is thereby represented by a plurality of samples.

This form of assembly would normally employ a wide magnetic head which has a multiplicity of individual reading channels. The channel spacing, by which is meant the track pitch, or more generally the centre to centre spacing of the channels, may be selected to be a sub-multiple of the normal length of a segment. For example, the track pitch or channel spacing may be one quarter or similar integer fraction of the standard segment length. Thus if the length of a segment is typically 2 mm, the channel spacing in the magnetic head assembly could be 0.5 mm. The manufacture of multiple channel head assemblies having such a channel spacing is within the competence of those skilled in the art of, for example, multiple track audio recording.

More particularly, the invention provides a security thread detector assembly for reading a security thread carried by a security document and coded such that each of a succession of segments of similar lengths along the thread represents a digital value, the particular digital value being represented by the particular characteristic of the respective segment, said assembly comprising a head having a multiplicity of parallel reading channels having a track pitch which is substantially less than the length of a segment and being disposed to present the document such that the thread is substantially broadside to the channels whereby all the segments which are to be sensed are sensed substantially simultaneously and each sensed segment is represented by a plurality of samples.

DETAILED DESCRIPTION OF PREFERRED EMBODIMENT

Figure 1:
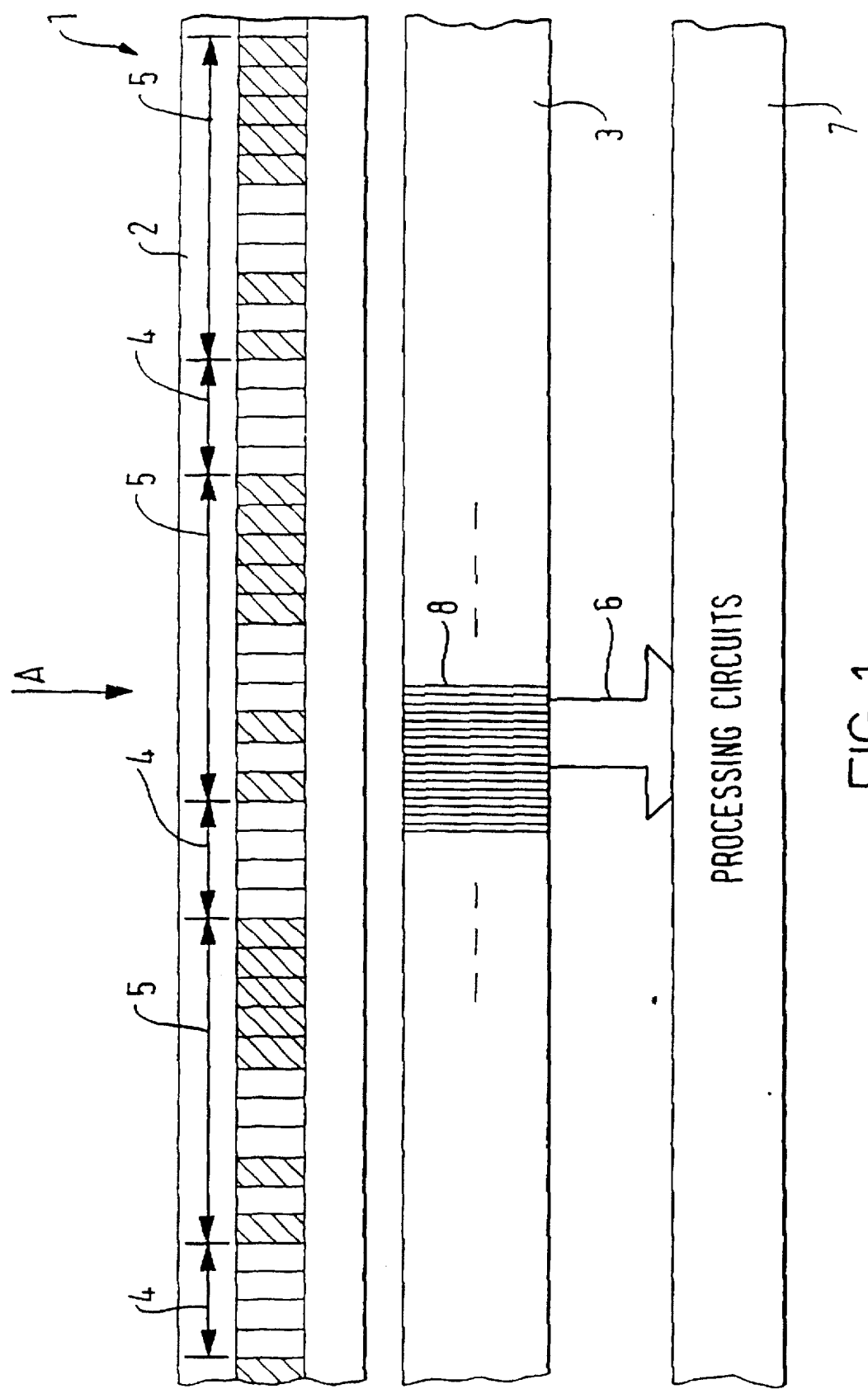
FIG. 1 illustrates in simplified schematic form the basic features of a detector assembly according to the invention.

In FIG. 1, a security thread 1 is to be read by a multiple track magnetic head 3 as the security thread 1 moves broadside to the detector, in the direction shown by the arrow A. Whether the detector assembly moves or the security thread moves or both move is not in a broad sense important, though it would be usual for the detector to be stationary and for the security thread 1, which would normally be part of, and preferably embedded within, a bank note, to be presented to the detector assembly by presentation of the bank note orthogonally to the reader that includes the detector assembly. Where the thread runs from top to bottom of a note parallel to the shorter sides, the note would preferably in accordance with the present invention be presented with one of the shorter sides leading into the reader.

The thread 1 is disposed on a substrate 2. This may be a polyester substrate and the thread may be part of a sandwich composed of two strips of polyester and an intermediate magnetic track. The magnetic track is coded such that a fixed length, typically 2 mm, of the track represents an individual binary digit, though other forms of coding are feasible. In the present example, which corresponds to the subject-matter of EP-B-0407550, a bit length or segment which represents a binary '1' is represented by the presence of magnetic material whereas the other binary digit, '0', is represented by the absence of magnetic material. The track which is shown in FIG. 1 is shown as divided notionally into segments for ease of understanding but there need be no physical discontinuity between adjacent segments that represent the same coded value. The track in this particular example consists of a succession of lengths, each composed of one or more segments of magnetic material, interspersed with spaces without magnetic material, the length of each section corresponding to the number of binary digits of the same value that occur in succession. The coding of the track is composed of termination words 4 interposed with data words 5, the termination words being composed of a run of binary 0's numerically greater than a maximum permitted run of binary 0's in a code word. As mentioned previously, other forms of coding are possible and, moreover, the binary digits can be represented by different magnetic characteristics of segments or in a variety of other ways. It is important for the length of a segment which denotes an individual digital value to be known and preferably constant along the length of the thread.

The detector assembly comprises a magnetic head having a multiplicity of reading channels disposed side by side. Only a few channels have been shown; the detector will normally have sufficient channels to span the whole length of the thread in the bank note, there being a channel spacing which is very much smaller than the standard segment length in the security thread 1, the channel spacing being preferably a sub-multiple (such as one quarter) the length of the standard segment in the security thread. By 'channel spacing' or 'track pitch' is meant normally the centre to centre spacing between channels. Each channel will comprise a magnetic core part with a non-magnetic gap adapted for reading the strip; adjacent core parts would normally be separated by non-magnetic guard layers in accordance with the known practice of constructing multiple track magnetic head assemblies.

Typically there may be one hundred and ninety-two side by side parallel channels in the detector assembly for a bank note which uses a standard segment length of 2 mm, the track pitch of the channels being 0.5 mm.

The individual channels are connected by a parallel connection 6 to processing circuits 7. These processing circuits may comprise preamplifiers and signal conditioning circuits which convert the analog waveform received by each individual head into a digital sample, preferably a binary digital sample, of the portion of the track read by the respective channel. Typically the primary signal output from the sensing winding on the magnetic core part of a channel will be an analog waveform composed of an initial pulse and a reverse pulse as the portion of a segment composed of magnetic material passes by the transducing gap. Where there is no magnetic material the primary signal may be very low or non-existent and, of course, if different magnetic materials or characteristics are used to denote the different binary values, the amplitudes of the primary signals from the channels will be different and can be separated by appropriate threshold discrimination, there being either a discriminator for each channel or the processing of the channel signals by a lesser number of discriminators on a time-shared basis.

Figure 2:
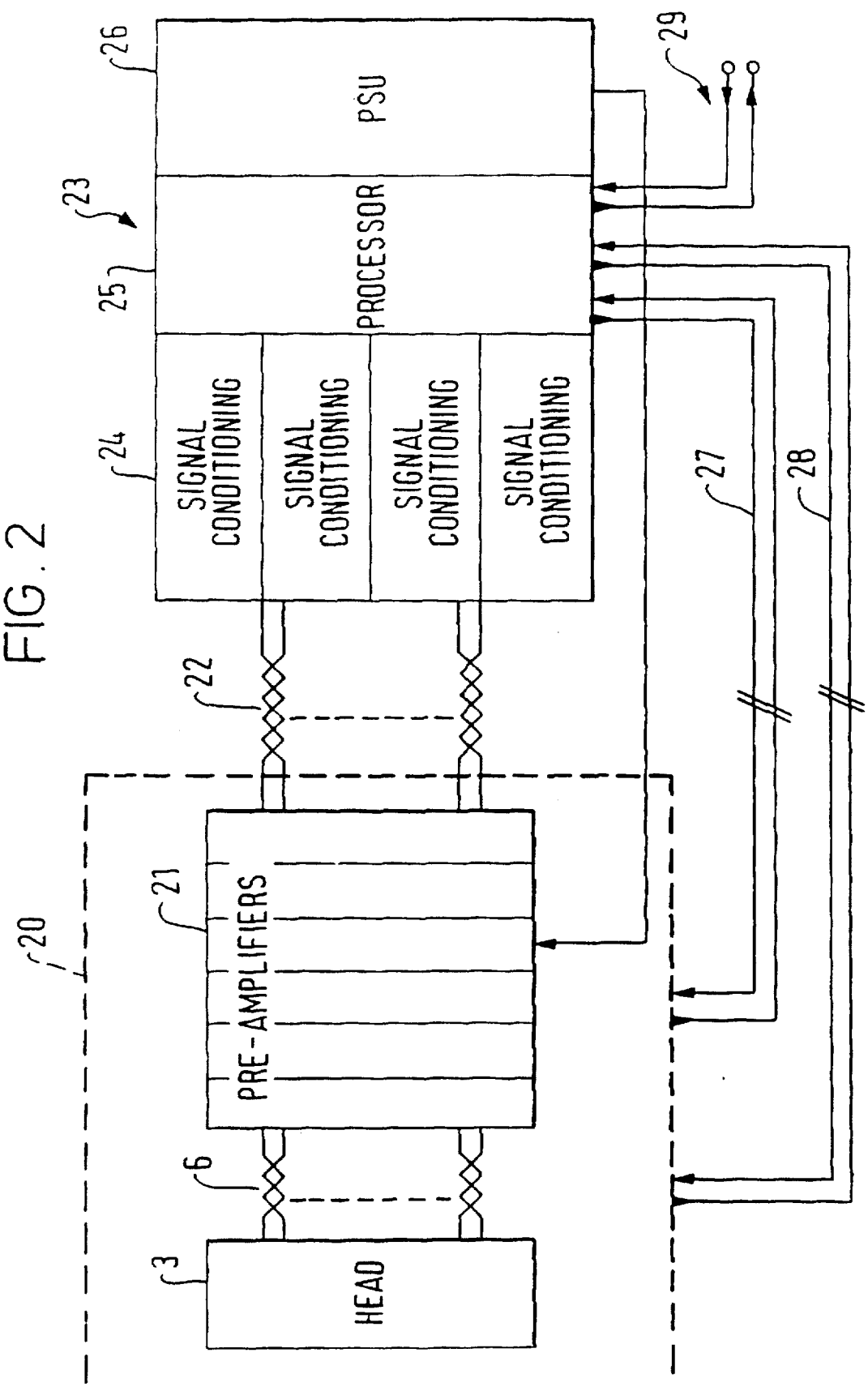
FIG. 2 is a thematic diagram of the detector assembly, the associated preamplifiers and processing electronics.

FIG. 2 is a schematic diagram showing the main elements of the read head, the preamplifiers and the associating processing electronics. The read head 3, the connection 6, comprising in this embodiment one hundred and ninety-two twisted cable pairs, and six boards 21 of preamplifiers, with thirty-two preamplifier channels per board, are disposed within a bank note sorter generally illustrated by the numeral 20. The particular construction of the note sorter is not important to the present invention and the reference to it is only intended to indicate the normal context of the present invention.

Each of the preamplifiers is connected by a twisted pair to a respective signal conditioning amplifier circuit on one or other of the signal conditioning boards 24 which are within an electronics rack 23. The rack also contains a main processor 25 and a PSU 26. The main processor is connected by an I/O interface 27 and a-serial link 28 to other components of the note sorter, for purposes not relevant to the present invention, and is also connected by way of a bidirectional serial link 29 to a computer console.

Figure 3:
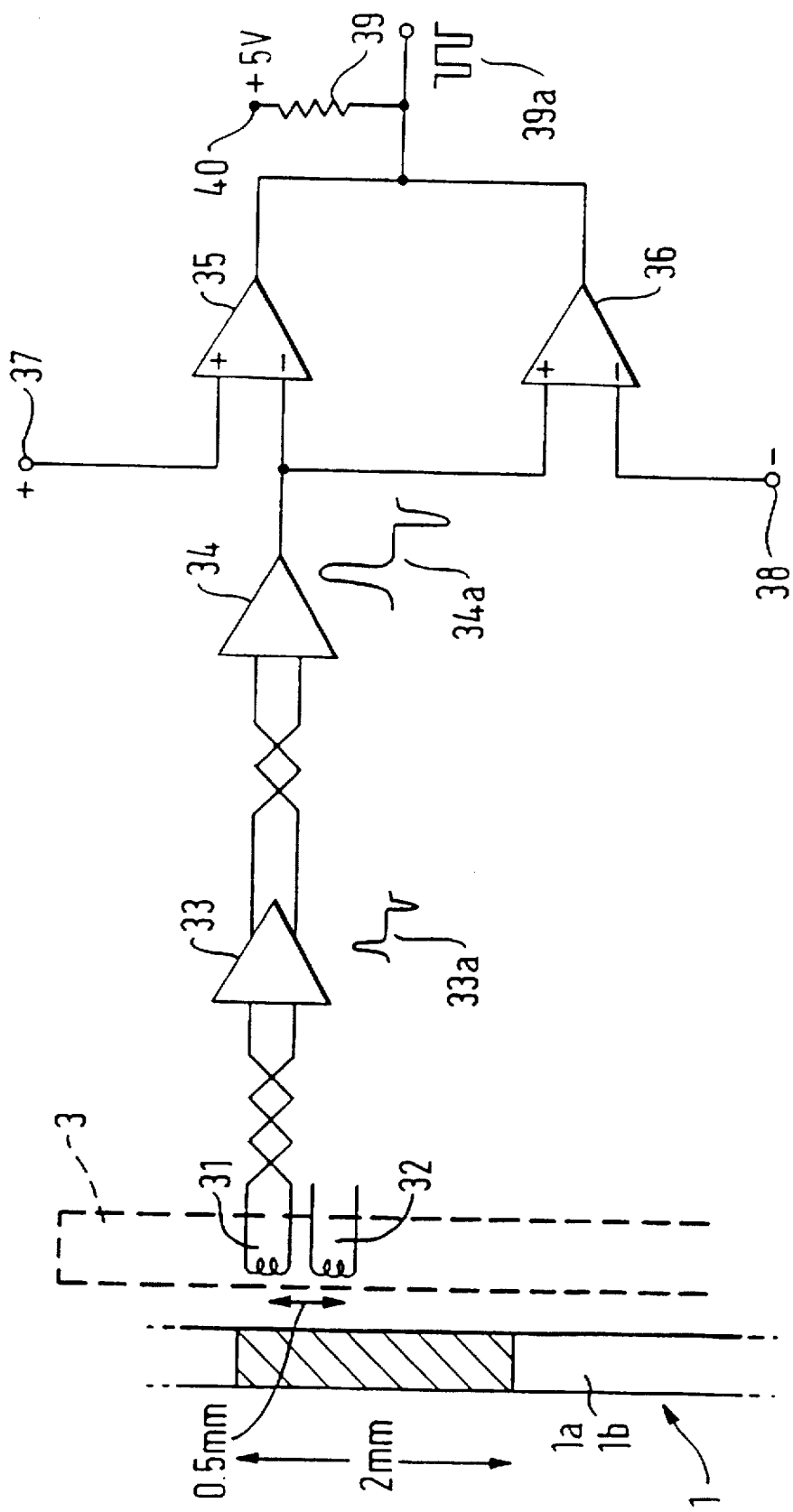
FIG. 3 is a more detailed schematic diagram of the processing circuits relating to a single channel of the detector.

FIG. 3 illustrates the main components of a single processing channel from the stage at which a segment of the security thread 1 is sensed to the point of which a digital sample representative of the magnetic state or characteristic of that segment is produced. The thread 1 is shown as comprising two adjacent segments 1a and 1b. This is only a very small part of the security thread. As described earlier, this thread 1 is being presented broadside, with a direction of movement left to right with reference to FIG. 3, to the magnetic reading head 3. As mentioned previously, this head comprises a multiplicity of channels of which the channel spacing is very much less than the length of segments such as segments 1a and 1b. A sense winding 31 disposed on the magnetic core part of the channel is connected (by the twisted pair connection) to a preamplifier 33, of which the output 33a is an analog waveform normally, if the segment is composed of magnetic material, comprising an initial positive going spike followed after a short delay by a negative going spike. The preamplifier 33 is connected by a respective twisted pair connection to the input of a signal conditioning amplifier. The preamplifier is provided so as to amplify the signal from the magnetic head to such an extent that it can be sent over a differential pair to the processing electronics, which are generally located remote from the magnetic read head.

The preamplifier may comprise either as an input stage or an output stage a low pass amplifier for the removal of high frequency noise and the signal conditioning amplifier may remove any DC component of the head signals. The amplified head signals 34a provided by the amplifier 34 are fed to the negative input of a differential high going amplifier 35 of which the pulsed input is connected to a positive threshold reference terminal 37 and the output of the signal conditioning amplifier 34 may also be connected to the positive input of a high going differential amplifier 36 of which the negative input is connected to a negative threshold reference 38. The output terminals of the amplifiers 35 and 36 may be mutually connected and coupled by way of a resistor 39 to a positive reference terminal 40.

The purpose of the comparator arrangement is to provide threshold detection for both positive going transients and negative going transients. The resultant output 39a from a magnetic segment 1a is a double pulse which can be converted to a single digital sample. In this example, any signal picked up from the scan of a segment 1b (having no magnetic material) will be insufficient to reach the thresholds set by the comparators 35 and 36 and accordingly the output will be zero.

Figure 4:
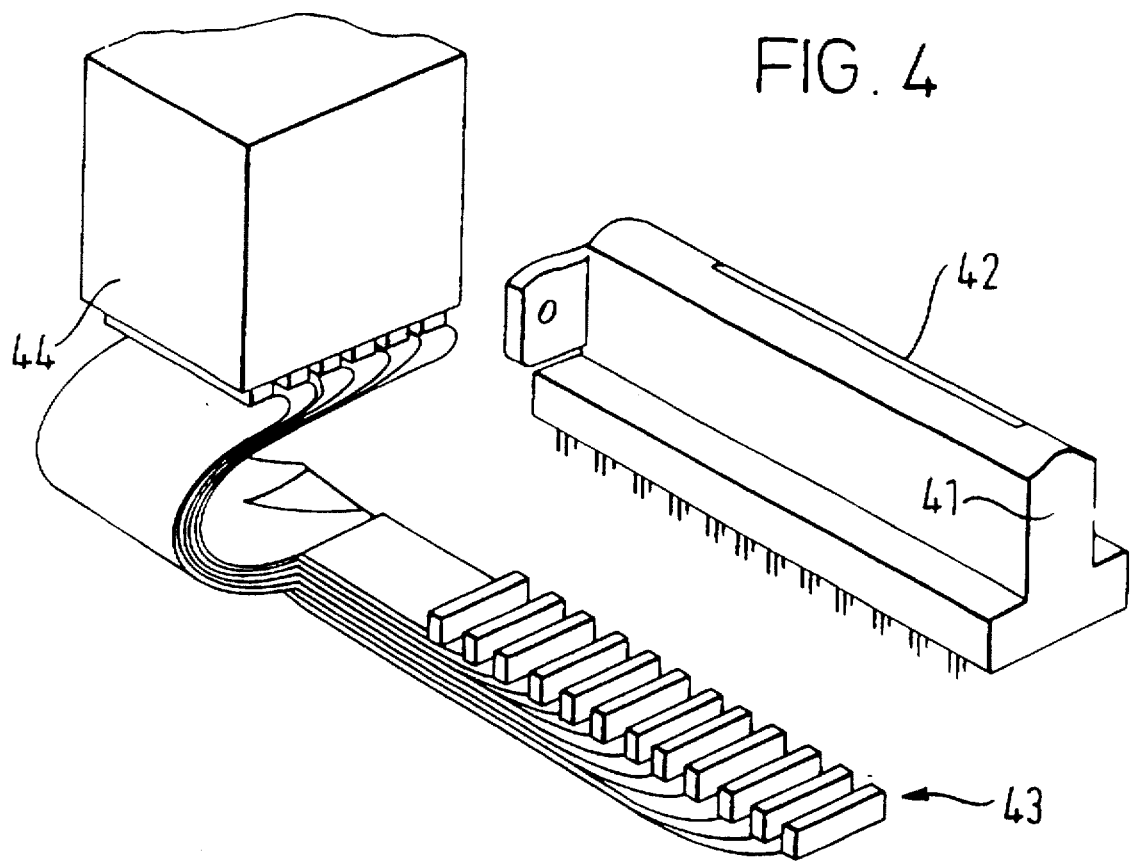
FIG. 4 illustrates the physical configuration of a magnetic read head and the immediately associated components.

FIG. 4 illustrates the physical configuration of the head assembly. The read head comprising an elongate body 41 having a ridge 42 against which the bank note may be pressed by means of a transport arrangement as described in our international Patent Application WO-A-95/27256 published 12 Oct. 1995. The head channels have connectors 43 which are connected by way of the set of twisted pairs 6 to a casing 44 for the preamplifiers.

The output of the multiplicity of channels in the magnetic head assembly will typically, after appropriate threshold detection, comprise a group of binary digital signals for each segment in the security thread. For example, if there are normally four samples for each segment, the track pitch being a quarter of the bit length of the thread, a section of magnetic track coded, for example 1010. . . . might be represented by a set of parallel output signals 1111000011110000 . . . . In practice such a set of signals can be examined in groups which nominally correspond in number to the number of samples per segment in order to derive the original coding of the thread. In this particular example, the output signals can be examined in groups of four samples. Typically, however, owing to slight misregistration of the magnetic segments with the reading channels, a particular segment might be represented by more than or fewer than the nominal number of samples. One segment might be represented by only three samples and the adjacent segment might be represented by five samples. Furthermore, samples taken from discontinuities between segments may be incorrect or be of insufficient amplitude to reach a detecting threshold. Therefore, the set of parallel output signals constituted by samples read from segments coding the word 1010 might, for the sake of example, be 111XX0000111X000 . . . . In this expression, the sign X is intended to represent a corrupt or indeterminate value. However, as will be apparent to those skilled in the art it is possible, by examining the samples and applying some criterion of tolerance, to achieve a probably correct framing for the groups of signals and to extract the original code using data extraction routines similar to those used for the recovery of serial binary data in the presence of noise. For example, it might be that the detection of three digits of the same value (1) within a group or frame is deemed sufficient to represent the original coded value (1). The choice of number of samples per segment and therefore the ratio between the channel spacing and the segment length, and also the criterion of discrimination between a sufficient and insufficient number of samples required to denote the detection of an original coded value, are matters which are at the discretion of the designer.

Figure 5:
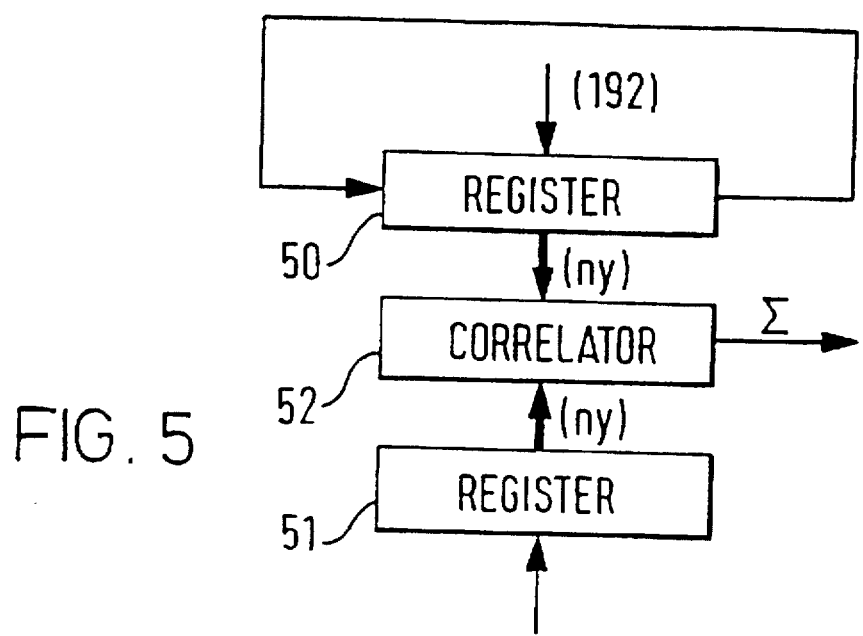
FIG. 5 illustrates a technique for the extraction of a coded data word.

FIG. 5 illustrates one form of correlator, which may be implemented either in hardware elements or by programming in a microprocessor, for detecting whether the thread has a code which matches a predetermined code.

As indicated in the foregoing, various techniques for detecting whether a particular digital code word, subject to degradation, is probably present, are well known. Several examples are given by Robert C Dixon in 'Spread Spectrum Systems', published by John Wiley, second edition (1984), chapters 5 and 6.

In the present case, if four-times oversampling is used so that the 192-bit signal represents 48 primary bits, a simple system may consist of counting the number of bits of one binary value and determining whether that number is within a range of tolerance about the actual number of bits of that binary value that should be produced by correspondingly oversampling a code word that should be present. Another example is to count the number of bits of the same kind within each group of four bits, as suggested above.

A more sophisticated scheme, wherein a search is made for a code word (or a code word and two termination segments) of aggregate length somewhat less than the bit length of the magnetic head, is specifically illustrated in FIG. 5.

The set of samples, representing a four-times over sampling of forty-eight consecutive bits, is fed into a first register 50. A second register 51 holds an oversampled version of a desired code word. For example, for n times oversampling of a y digit code word, the length of the second register is ny bits. A correlator makes a comparison of each of the bits of the reference code word with a respective stage in the register 50. The correlator may comprise therefore ny AND gates, each coupled to a respective location in the first register and a respective location in the second register or a similar connection of exclusive OR gates, in each case there being an adder for summing the outputs of the ny gates. The contents of the first register are recirculated, at an appropriately high clock rate. If the sampling were perfect, the output (which otherwise might be termed a convolution sum) of the correlator should reach a peak corresponding to an exact match of ny bits. In practice the peak sum would be less than the theoretical maximum and a threshold may be set so that detection is achieved when the convolution sum exceeds some threshold less than the absolute maximum.

Other techniques of correlation, for example a delay line correlator, may be used if preferred.

The foregoing is intended to be illustrative only and not limitative. For example, the length of a segment need not be constant provided that it is known to vary in a predetermined manner along the length of the thread so that recovery of the original code is possible by appropriate programming of the data recovery process. Furthermore, it may not be necessary to read all the segments, particularly if the coding of the thread is repetitive, comprising similar code words interspersed by termination words, so that reading the segments of two termination words and the intervening code word may be sufficient.

I claim:

1. A method of reading a security thread carried by a security document and coded such that each of a succession of segments along the thread represents a digital value, each digital value being represented by the characteristic of the segment, the method comprising the steps of providing a multiplicity of side-by-side reading channels having a track pitch which is substantially less than the length of a segment, presenting the document such that the thread is substantially broadside to the channels so that all of the segments which are to be sensed are sensed substantially simultaneously, representing each sensed segment by a plurality of samples, applying to at least one group of samples a numerical criterion of tolerances such that any segment may be validly represented by more than or fewer than a nominal number of samples, the nominal number corresponding to said plurality of samples and being at least four, and detecting a code represented by the segments.

2. A method according to claim 1 wherein the document is rectangular and the thread is parallel to shorter sides of the document, and including presenting the document with one of the shorter sides leading.

3. A method according to claim 1 wherein the group of samples represents a multiplicity of segments.

4. A method according to claim 1 wherein the samples of a plurality of groups are examined and the digits representing the same binary value within a group are counted.

* * * * *